United States Patent [19]
Eimer et al.

[11] 3,828,930
[45] Aug. 13, 1974

[54] FILTER SCREEN INSTALLATION

[75] Inventors: Klaus Eimer, Ratingen; Heinz Thal, Lintorf, both of Germany

[73] Assignee: Ludwig Taprogge (Cleaning Installations for Pipe Heating Exchanger), Dusseldorf, Germany

[22] Filed: May 25, 1973

[21] Appl. No.: 363,797

[30] Foreign Application Priority Data
May 26, 1972 Germany.............................. 2225727

[52] U.S. Cl.................. 210/137, 210/405, 210/421, 210/435, 210/456
[51] Int. Cl............................................ B01d 29/42
[58] Field of Search ........... 210/137, 304, 316, 405, 210/421, 422, 435, 456, 457; 55/205

[56] References Cited
UNITED STATES PATENTS
1,204,756   11/1916   Goldblatt........................... 210/422
2,099,502   11/1937   Stockdale ...................... 210/422 X
3,063,566   11/1962   Hanley............................ 210/422 X
3,174,622   3/1965    Lamort........................... 210/304 X Primary Examiner—Roy Lake
Assistant Examiner—DeWalden W. Jones
Attorney, Agent, or Firm—Craig & Antonelli

[57] ABSTRACT

A filtering device is described for separating solid impurities from a liquid stream in a pipeline of the shell filter type used in cooling lines of power plants. An adjusting valve is pivotally arranged in the inlet connection to the device in such a manner that the liquid stream flows in a swirling stream around a cylindrical filter screen basket thereby removing deposited solids from the surface of the filter.

9 Claims, 4 Drawing Figures

FILTER SCREEN INSTALLATION

This invention relates to a filtering device for separating solids from a liquid stream in a pipeline. The filtering device includes a cylindrical screen preferably concentrically disposed within a cylindrical separator housing having a radial inlet pipe connection, an axial outlet pipe connection for the liquid stream and a discharge outlet for the separated solids. Such a filtering device is principally used as a so-called shell filter in cooling systems for power plants, and is of the type described in the copending U.S. Pat. application, Ser. No. 196,474, now U.S. Pat. No. 3,789,992, by Friedrich-Wilhelm Treplin, Guido Veltman and Heinz Thal, and assigned to the same assignee as the present application. An installation of this type is particularly advantageous in cooling water systems having mussel growths contamination of the system. Other types of contaminations and impurities may occur in the cooling water, such as, for example, a fibrous structure of algae, weeds or predominately flat-shaped structures, such as leaves, or, more frequently in recent times residues of used packaging foils.

In a filter device such as found in the abovementioned application, an adjusting valve is pivotally arranged in the radial inlet pipe connection, so that shells and fibrous impurities entrained on a liquid stream are deposited on the cylindrical filter screen and are discharged from the device by flushing the screen during a flushing phase. The impurities may also be removed from the cylindrical screen by continuous small partial stream discharged through the discharge aperture. Adjustment of the inlet valve in this device facilitates the removal of deposited impurities on the cylindrical screen through the discharge duct by means of an intense swirling flow about the screen. The intensity of the inlet flow can be regulated by varying the position of the pivotally mounted adjusting valve.

Such excitation of an intense swirling flow about the screen basket, or cylindrical screen, by regulating the adjusting valve, permits the impurities to migrate toward the discharge duct, so that a partial stream exiting through the discharge duct carries the impurities through the discharge duct. In this manner, the filtering installation functions by maintaining the swirling flow in a stable and sufficiently high energy fluid stream. The range of regulation of this swirling flow is determined by the adjustable range of the adjusting valve.

The present invention provides an improved means for increasing the regulation of the swirling flow by the adjusting valve, while minimizing the pressure losses unavoidably obtained in producing a highly effective swirling flow.

To achieve this improvement, consideration is given in the present invention to the fact that the swirling fluid flow, excited by the adjusting valve, should have a minimum velocity in the annular space between the screen surface and the housing, regardless of whether the quantity of water passing through the filter is large or small. Furthermore, sufficient turbulence must be superimposed in all instances to the swirling fluid flow, preferably in the form of a vortex street with the individual vortices being large, as compared with the average size of the contaminents to be removed from the screen surface. Any disturbance, for example, the main stream being directed perpendicular to the screen surface or perpendicular to the wall of the housing, will reduce the size of the vortices, thereby reducing their ability to remove impurities from the sieve surface and carry such contaminents into the main stream of the swirling fluid flow. According to the present invention, the formation of a defined swirling flow can be effected by connecting guide elements, or baffles, to both sides of the adjusting valve and spacing the baffles therefrom.

These guide baffles are pivotable together with the adjusting valve. The guide baffles of the invention have approximately the same size as the adjusting valve, but variations in size may be obtained by the space limitations of the inlet pipe connection within which the valve and guide baffles must be accommodated and pivoted. A considerable increase in the regulating and adjusting range of the device is achieved by using the guide baffles of the present invention.

In one embodiment of the present invention, the guide baffles are arranged in parallel to the adjusting valve at a spacing which approximately corresponds to one-half the radius of the inlet pipe connection. In another, more advantageous embodiment, the guide baffles are connected in a converging manner to the adjusting valve so as to project in the direction of the cylindrical screen similarly to a nozzle. This nozzle-like arrangement is effected by an inclined disposition, arcuate configuration or profiling of the guide baffles.

As a further embodiment, the swirling flow is enhanced by providing that the inlet pipe connection flares trumpet-like at its entrance into the separator housing, preferably with a flaring angle of 15° or more. Such flaring angles have been suggested in filter installations not having an inlet adjusting valve but are normally considered disadvantageous in flowing streams. However, such flaring angles are found to be surprisingly advantageous in this case, particularly with respect to the lateral surfaces of the inlet pipe connection.

As a general rule, the adjustable valve, the guide baffles and the trumpet-like flared inlet pipe, all are arranged with respect to one another so that, at an average fluid quantity passing through the filter, the intake stream touches the cylindrical screen tangentially with a velocity of between 10–15 ft/sec.

The present invention utilizes the fact that formation of a defined swirling flow is improved by the guide baffles wherein the energy of the swirling flow can be regulated by the angle of the valve adjustment over a wide range. Accordingly, the operating conditions are varied in such a manner that practically all existing impurities are removed from the screen and conveyed to the discharge duct. Although in single adjusting valve arrangements, pressure losses occur dependent on the adjustment angle of the valve because of liquid flow separation, which does not contribute to the effectiveness of the swirling flow, these pressure losses are reduced in the filtering device of the present invention, since the flow is channeled by the guide baffles, thereby reducing flow separation. Accordingly, a no-loss inlet flow is achieved, particularly with respect to the formation of the swirling flow, such that all impurities are removed from the cylindrical screen by super-imposed turbulence.

The invention will be described in greater detail below with reference to the drawings, in which the various embodiments of the present invention are shown. The drawings are schematic views.

Figure 1:
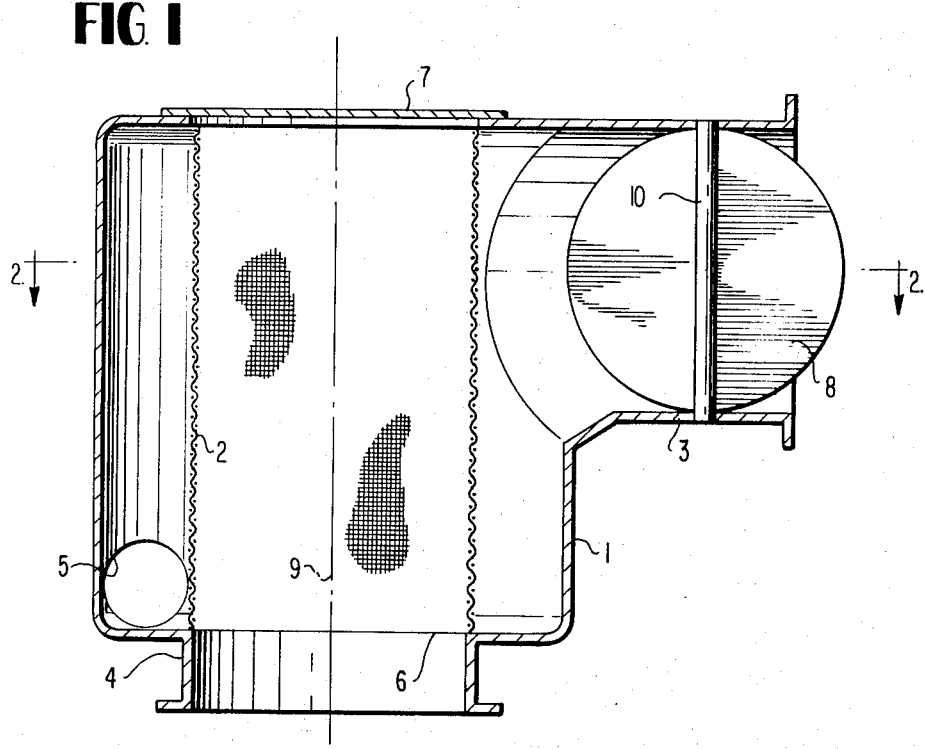
FIG. 1 is an axial section through a filtering installation according to the present invention.

The filtering device shown in the Figures serves for the separation of solids from a fluid stream in a pipeline. In its basic construction, the installation includes a cylindrical separator housing 1 with a cylindrical screen, or filter 2, disposed preferably concentrically therein. A radial inlet pipe connection 3, and an axial outlet pipe connection 4 are provided for passing the liquid stream into the separator housing and out of the screen 2, respectively. A separate discharge 5 is disposed preferably tangentially with respect to the separator housing in order to discharge the solid impurities. The screen 2 is connected at the base 6 to the outlet pipe connections 4 and is joined at its other end to a housing lid 7, secured to the separator housing 1. An adjusting valve 8 is pivotally mounted in the radial inlet pipe connection 3, which valve is preferably a circular butterfly valve and pivoted about an axis 10 in parallel to the screen axis 9. The discharge duct 5 for the solids is disposed in the area of the screen base 6. In this arrangement and in accordance with the preferred embodiment of this invention, the cross-section of the adjusting valve 8 conforms to the cross-section of the inlet pipe connection 3.

Figure 2:
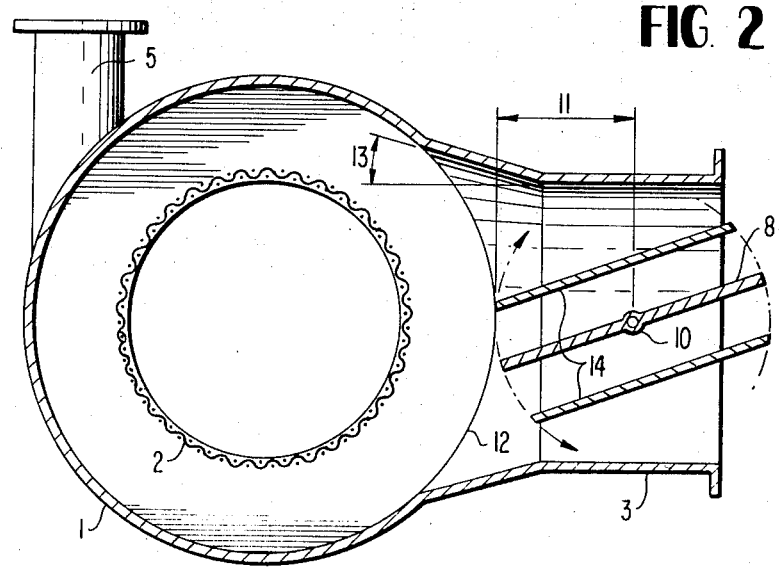
FIG. 2 is a section showing one embodiment of the present invention along line A—A through the installation of FIG. 1.

From FIG. 2, it can be seen that guide baffles 14 are connected on each side of the adjusting valve 8 and spaced therefrom to form the guide elements. The spacing of the guide baffles 14 from the adjusting valve 8 is preferably by a distance of one-half the radius of the radial inlet pipe connection 3. These baffles are pivotable together with the adjusting valve 8 and have approximately the same size as the adjusting valve. However, it is to be taken into account that the total unit of adjusting valve 8 and baffles 14 must be accommodated in the radial inlet pipe connection 3 and must be pivoted therein. The guide baffles 14 are connected preferably by aerodynamic mountings 15, as may be seen in FIG. 3, to the adjusting valve 8.

Figure 3:
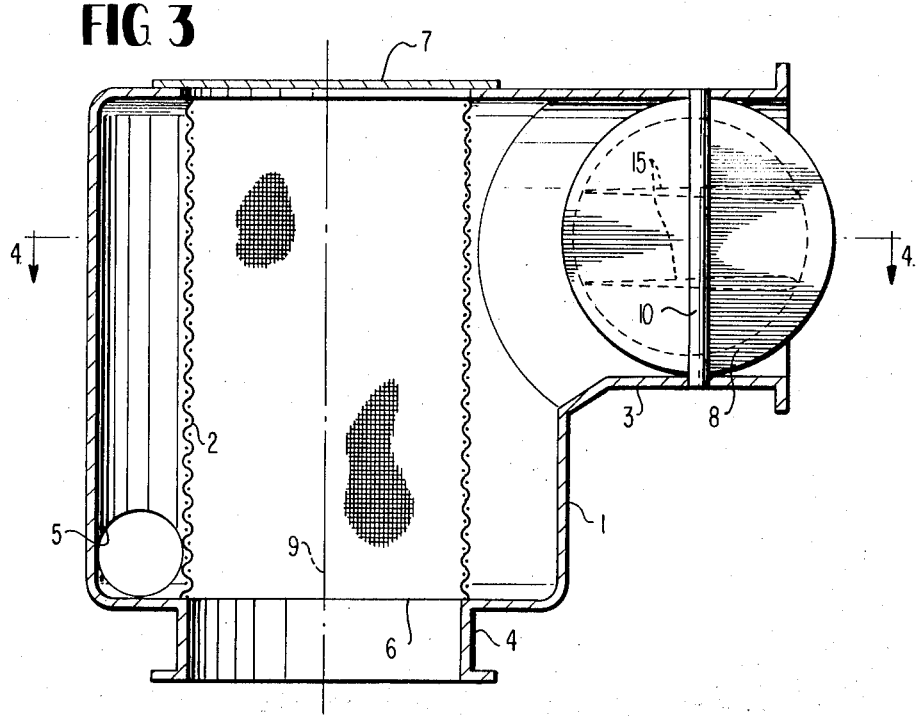
FIG. 3 is an axial section showing another arrangement of the device of FIG. 1.
Figure 4:
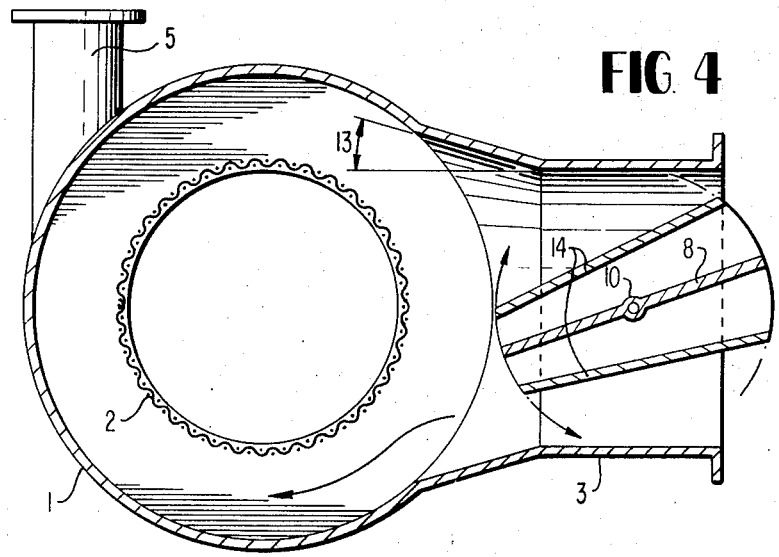
FIG. 4 is a section showing a further embodiment of the present invention in the direction A—A through the device of FIG. 3.

As may be further seen in FIGS. 3 and 4, the baffles 14 may be arranged such that the baffles 14 converge in the manner of a nozzle projecting in the direction toward the separator housing. This nozzle arrangement may be realized by a simple oblique positioning of the baffles 14, as may be noted in FIG. 3, but it is also possible to provide a special curvature for the baffles 14. Thus, it is possible from the embodiment of FIGS. 3 and 4 to produce with a wide adjustment range of the adjusting valve 8 and guide elements 14 an energetic swirling flow in the annular space between the separator housing 1 and the screen 2, which is always formed in such a manner that it entrains any impurities deposited on the screen surface and then forces these impurities to travel downwardly toward the discharge duct 5.

In a further embodiment, as may be seen from the Figures, the inlet pipe connection 3 may be flared in the manner of a trumpet immediately preceding the connection into the separator housing. A flaring angle 13 of about 15° or more is suitable for the present invention.

It is to be understood that the present invention is not limited to the described embodiments, but is susceptible to numerous changes and modifications as known to those skilled in the art and, therefore, the present invention is not to be limited to the details shown and described herein, but is intended to cover all changes and modifications as are encompassed by the scope of the appended claims.

What we claim is:

1. A filtering installation for separating solids from liquid streams in pipelines comprising a cylindrical separator housing means, a cylindrical filtering means disposed within said separator housing means, radial inlet pipe connection means disposed at a peripheral surface of said separator housing means for introducing a liquid stream carrying solids into said separator housing means, an outlet pipe connection means disposed axially adjacent an end of said cylindrical filtering means for discharging said liquid stream after passing through said cylindrical filtering means, a discharge means connected to said separator housing means for discharging solids separated from said liquid stream by said cylindrical filtering means, and valve means pivotally arranged in said inlet pipe connection means for adjusting the flow of said introduced liquid stream, said valve means having baffle elements secured at a spacing from both sides of a valve element with said baffle element and said valve element being pivotable together.

2. A filtering installation according to claim 1, wherein said cylindrical filtering means is a cylindrical mesh screen basket with one end secured to a housing lid of said separator housing means and on opposite end connected to said outlet pipe connection means.

3. A filtering installation according to claim 2, wherein said cylindrical filtering means is concentrically disposed within said cylindrical separator housing means.

4. A filtering installation according to claim 1, wherein said cylindrical filtering means is concentrically disposed within said cylindrical separator housing means.

5. A filtering installation according to claim 1, wherein said baffle elements and said valve element are approximately the same size.

6. A filtering installation according to claim 5, wherein said baffle elements are spaced from said valve element at a distance corresponding to approximately one-half the radius of said radial inlet pipe connection means.

7. A filtering installation according to claim 1, wherein said baffle elements are spaced from said valve element at a distance corresponding to approximately one-half the radius of said radial inlet pipe connection means.

8. A filtering installation according to claim 1, wherein said baffle elements converge in a direction toward separator housing means in the form of a nozzle.

9. A filtering installation according to claim 1, wherein said inlet pipe connection means flares at said peripheral surface of said separator housing means with a flaring angle of at least 15°.

* * * * *